(12) United States Patent
Moscatelli

(10) Patent No.: US 10,678,275 B2
(45) Date of Patent: Jun. 9, 2020

(54) CONNECTION DEVICE FOR FLUID CIRCUITS

(71) Applicant: FINMECCANICA—Società per azioni, Rome (IT)

(72) Inventor: Antonio Moscatelli, Turin (IT)

(73) Assignee: Leonardo S.p.A. (IT)

( * ) Notice: Subject to any disclaimer, the term of this patent is extended or adjusted under 35 U.S.C. 154(b) by 685 days.

(21) Appl. No.: 15/145,639

(22) Filed: May 3, 2016

(65) Prior Publication Data

US 2016/0327965 A1 Nov. 10, 2016

(30) Foreign Application Priority Data

May 5, 2015 (IT) .......................... 102015000013948

(51) Int. Cl.

| G05D 23/02 | (2006.01) |
|---|---|
| F16L 29/00 | (2006.01) |
| F16L 55/07 | (2006.01) |
| F16K 31/00 | (2006.01) |
| F16L 23/00 | (2006.01) |
| F16L 55/10 | (2006.01) |
| F16L 29/04 | (2006.01) |

(52) U.S. Cl.
CPC ......... G05D 23/025 (2013.01); F16K 31/002 (2013.01); F16L 23/00 (2013.01); F16L 29/00 (2013.01); F16L 29/04 (2013.01); F16L 55/07 (2013.01); F16L 55/1007 (2013.01)

(58) Field of Classification Search
CPC ... F16L 27/0857; F16L 27/107; F16L 27/108; F16L 27/1085; F16L 27/11; F16L 27/111; F16L 51/02; F16L 51/03

USPC ..... 137/863, 225, 315.05, 414, 505.36, 510, 137/859
See application file for complete search history.

(56) References Cited

U.S. PATENT DOCUMENTS

| 2,839,314 A * | 6/1958 | Clark ...................... F16L 37/23 |
| | | 137/614.04 |
| 2,962,303 A * | 11/1960 | Ramberg ................ F16L 37/23 |
| | | 137/614 |
| 3,291,152 A | 12/1966 | Comer |
| 8,109,290 B2 * | 2/2012 | Sato ........................ F16L 37/34 |
| | | 137/614.04 |

(Continued)

FOREIGN PATENT DOCUMENTS

| DE | 102006021327 A1 | 11/2007 |
| EP | 2631183 A1 | 8/2013 |

OTHER PUBLICATIONS

Extended European Search Report dated Sep. 27, 2016 in corresponding European Patent Application No. 16167605.1, filed Apr. 29, 2016.

(Continued)

*Primary Examiner* — Nelson J Nieves
*Assistant Examiner* — Meraj A Shaikh
(74) *Attorney, Agent, or Firm* — Waller Lansden Dortch & Davis, LLP; Matthew C. Cox

(57) ABSTRACT

The connection device comprises two thermal expansion valves releasably connected directly to each other, each valve being configured to be mounted to an end of a respective section of a fluid circuit and being shiftable between an open position and a closed position, in which it allows and prevents fluid flow through the device, respectively, depending on the fluid temperature.

6 Claims, 4 Drawing Sheets

(56) References Cited

U.S. PATENT DOCUMENTS

2007/0295016 A1* 12/2007 Robin .................. F25B 41/062
62/224
2015/0114607 A1* 4/2015 Moscatelli ............ F28D 15/043
165/104.26

OTHER PUBLICATIONS

Italian Internationai Search Report dated Jan. 4, 2016.
Written Opinion dated May 5, 2015.

* cited by examiner

CONNECTION DEVICE FOR FLUID CIRCUITS

BACKGROUND OF THE INVENTION

The present invention relates to a connection device for fluid circuits shiftable between a first operating position, in which it allows hydraulic connection of two adjacent sections of the circuit, and a second operating position, in which it allows disconnection of the two adjacent sections of the circuit without causing fluid losses from the circuit, wherein the operation of connecting and disconnecting the two circuit sections can be carried out under load, i.e. with at least one of the two circuit sections containing fluid under pressure.

A connection device for fluid circuits according to the preamble of the accompanying independent claim 1 is known from U.S. Pat. No. 3,291,152.

Connection devices for fluid circuits of the type mentioned above are commonly known by the acronym SSQD ("Self-Sealing Quick Disconnect"). The known SSQD devices typically use mechanical springs to ensure that a closure member is closed during the disconnection operation, thereby preventing loss of the fluid to the outside from the two circuit sections to be disconnected. These known devices have a number of disadvantages, including first of all that, as soon as the two circuit sections have been connected, they generate a pressure wave (the so-called "fluid hammer") which propagates within the circuit. In order to avoid the risk that the pressure wave may damage components of the circuit which are particularly sensitive to overpressure conditions, it is necessary to adopt suitable measures, for example installing an accumulator arranged to absorb the pressure peaks within the circuit. Furthermore, the known connection devices are heavy and bulky, as well as structurally complex and therefore also particularly expensive, to such an extent that they are used exclusively in very specific applications, for example in the space industry.

US 2015/0114607 discloses a dual-phase fluid circuit, comprising an evaporator device arranged to receive heat from a hot body, a condenser device arranged to transmit heat to a cold body, a first conduit through which a working fluid, in vapour phase, flows from the evaporator device to the condenser device, and a second conduit through which the working fluid, in liquid phase, flows from the condenser device to the evaporator device. The circuit further comprises a pair of first thermal expansion valves, which are placed upstream and downstream of the condenser device, respectively, and are configured to prevent or allow the flow of the working fluid within the circuit depending on the temperature of the working fluid through the condenser device, as well as a pair of second thermal expansion valves, which are placed upstream and downstream of the evaporator device, respectively, and are configured to prevent or allow the flow of the working fluid within the circuit depending on the temperature of the working fluid through the evaporator device. When the two first (and/or the two second) thermal expansion valves are in the closed position, it is possible to disassemble the circuit section interposed between said valves, for example to replace the condenser device (and/or the evaporator device), without having to empty the entire circuit. According to this known solution, however, the disconnection of the two first (or of the two second) valves from the circuit section interposed therebetween causes the loss of the working fluid contained in said circuit section, which has to be avoided in the case where the working fluid is a hazardous fluid, for example a toxic, reactive or very hot fluid. This known solution is therefore not able to allow for the disconnection of two adjacent circuit sections without causing fluid loss from the circuit.

SUMMARY OF THE INVENTION

It is an object of the present invention to provide a connection device for fluid circuits which is not affected by the disadvantages of the prior art discussed above, that is to say, which completely avoids the formation of pressure peaks within the circuit as a result of the connection of the two circuit sections, which is less heavy, less bulky, structurally simpler and less expensive than the known SSQD devices, and which makes it possible to disconnect the two circuit sections without causing fluid loss from the circuit.

This and other objects are achieved fully according to the present invention by a connection device for fluid circuits having the features set forth in the accompanying independent claim 1.

Further advantageous features of the invention are defined in the dependent claims, the subject-matter of which is to be understood as forming an integral and integrating part of the following description.

In short, the invention is based on the idea of providing a connection device comprising two thermal expansion valves releasably connected directly to each other, each valve being configured to be mounted to the end of a respective circuit section and being shiftable, depending on the fluid temperature sensed by the valve, between an open position and a closed position, in which it allows and prevents fluid flow through the valve, respectively. The use of thermal expansion valves to allow or prevent fluid flow through the device makes it possible to provide a device which has a simple design, is lightweight, not bulky and not expensive, and is therefore suitable for large-scale use.

According to an embodiment of the invention, the two thermal expansion valves are configured in such a way as to shift to the closed position, thereby allowing disconnection of the two circuit sections, when the fluid temperature is below a given threshold. According to an alternative embodiment of the invention, the two thermal expansion valves are configured in such a way as to shift to the closed position, thereby allowing disconnection of the two circuit sections, when the fluid temperature is above a given threshold.

Preferably, the two valves comprise each a tubular casing which is configured to be connected at a first end thereof to the respective circuit section and at a second end thereof, opposite to the first one, to the casing of the other valve and which has, at this second end, a valve seat delimiting a through opening, a closure member movable relative to the valve seat to control fluid flow through the through opening, and temperature-sensitive control means for controlling movement of the closure member to close or open the through opening depending on the fluid temperature.

BRIEF DESCRIPTION OF THE DRAWINGS

Further features and advantages of the invention will become clearer from the following detailed description, given purely by way of non-limiting example with reference to the accompanying drawings, in which.

DETAILED DESCRIPTION OF PREFERRED EMBODIMENTS

Figure 1:
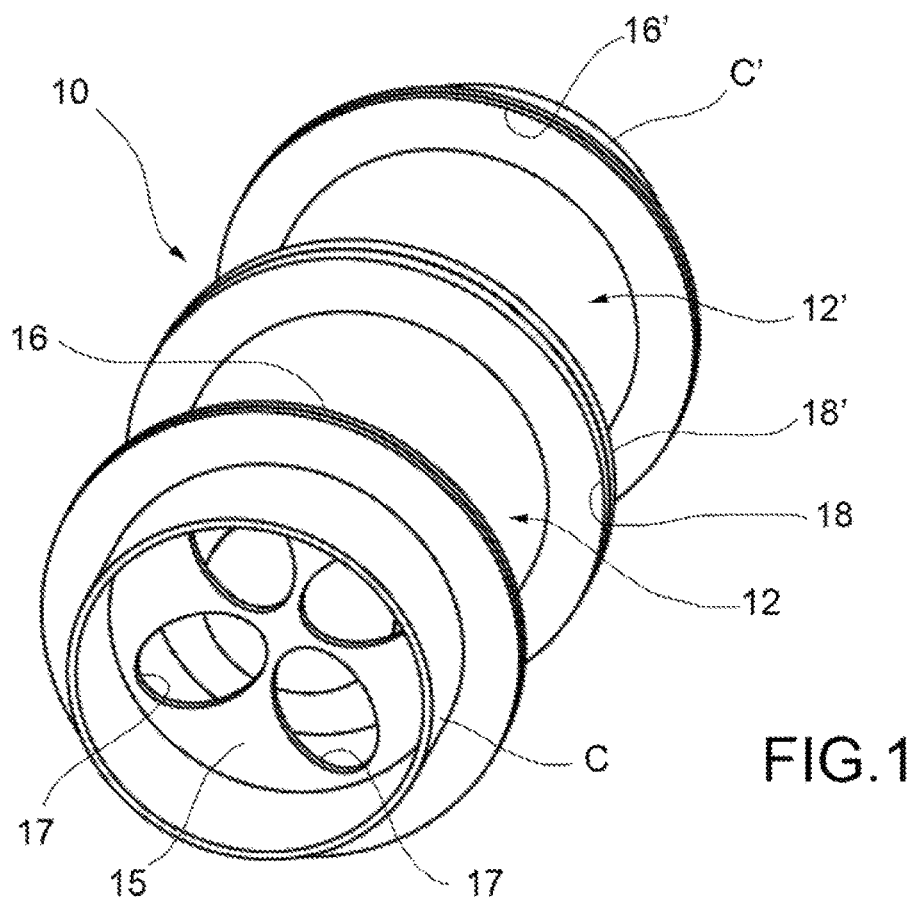
FIG. 1 is an isometric view of a connection device according to an embodiment of the present invention.
Figure 2:
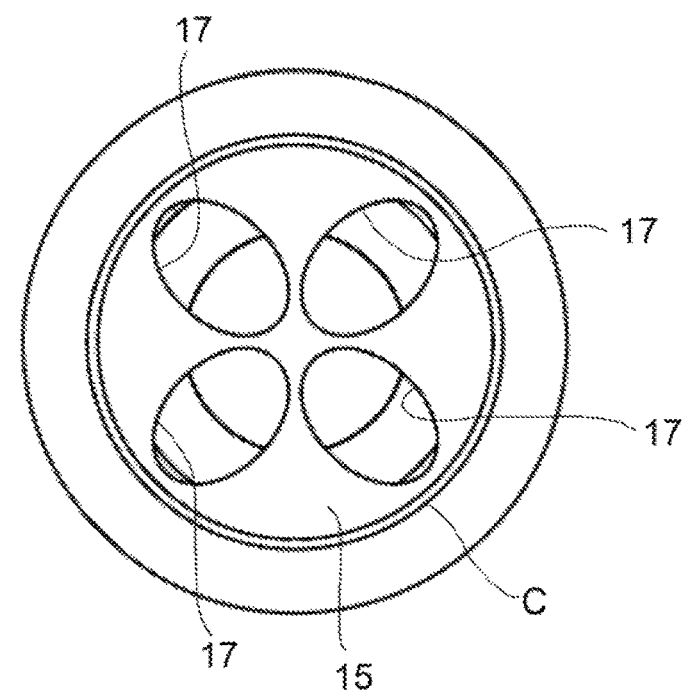
FIG. 2 is a front view of the connection device of FIG. 1.

With reference first to FIGS. 1 to 4, a connection device (hereinafter simply referred to as "device") for fluid circuits according to a first embodiment of the present invention is generally indicated 10. The device 10 is intended to hydraulically connect two adjacent circuit sections, indicated C and C', respectively, and is configured to allow disconnection of the two circuit sections C and C' without causing fluid losses from the circuit, even when at least one of the two circuit sections contains fluid under pressure.

The device 10 comprises a pair of thermal expansion valves, indicated 12 and 12', respectively. The valve 12 is mounted, for example by means of screws (not shown), to an end of the first circuit section C, while the valve 12' is mounted, for example by means of screws (not shown), to an end of the second circuit section C'. The two valves 12 and 12' are releasably connected directly to each other, for example by means of screws (not shown). Each of the two valves 12 and 12' is shiftable between an open position (shown in FIG. 3) and a closed position (shown in FIG. 4), in which it allows and prevents fluid flow through the device 10, respectively, depending on the fluid temperature sensed by the valve. In particular, in the embodiment shown in FIGS. 3 and 4, the two valves 12 and 12' are configured so as to be both in the open position at the working temperature of the fluid and to shift to the closed position when the fluid temperature falls below a given threshold value, lower than (or at most equal to) the working temperature of the fluid.

Preferably, as in the embodiment shown, the two valves 12 and 12' are identical to each other. Corresponding parts and elements of the two valves are identified by the same reference numerals, with an apex being added for the valve 12'.

Each valve 12, 12' comprises a tubular casing 14, 14' which extends along a longitudinal axis x. The casing 14, 14' is closed at one of its opposing axial ends, namely at the end at which the valve 12, 12' is connected to the respective circuit section C, C', by a wall 15, 15' having a plurality of openings 17, 17' for allowing fluid flow through said wall. At one of its axial ends, the casing 14, 14' forms a first mounting flange 16, 16' for connection to the respective circuit section C, C', while at the opposite axial end the casing 14, 14' forms a second mounting flange 18, 18' for connection to the casing 14', 14 of the other valve 12', 12 of the device 10. At said second axial end, the casing 14, 14' has a valve seat 20, 20' which delimits a through opening 22, 22' for allowing fluid flow therethrough. The fluid flow through the through opening 22, 22' is controlled by a closure member 24, 24'. In the open position of the valve 12, 12', as is shown in FIG. 3, the closure member 24, 24' is spaced apart from the valve seat 20, 20', and thus allows fluid flow through the through opening 22, 22', whereas in the closed position of the valve, as is shown in FIG. 4, the closure member 24, 24' rests against the valve seat 20, 20', and thus prevents fluid flow through the through opening 22, 22'.

Each valve 12, 12' further comprises temperature-sensitive control means, which are operatively associated with the closure member 24, 24' for controlling movement of the latter between the open position and the closed position depending on the fluid temperature sensed by the valve. In this case, the closure member 24, 24' is moved from the open position to the closed position when the fluid temperature sensed by the valve falls below the aforementioned threshold value, while the opposing movement, that is to say, from the closed position to the open position, occurs when the fluid temperature sensed by the valve exceeds the aforementioned threshold value. In the embodiment proposed herein, the control means are formed by a bellow 26, 26', which can extend along the longitudinal axis x and is fixed at an end thereof to the closure member 24, 24' and at the opposite end to the wall 15, 15'. The bellow 26, 26' is sealingly filled with a gas or liquid and therefore it expands, becoming longer, when the temperature of the fluid flowing through the device increases, whereas it contracts, becoming shorter, when the temperature of the fluid decreases. The lengthening of the bellows 26, 26' of the two valves 12, 12' causes the respective closure members 24, 24' to move away from the respective valve seats 20, 20', thus allowing fluid flow through the device. On the contrary, the shortening of the bellows 26, 26' of the two valves 12, 12' causes the respective closure members 24, 24' to move closer to the respective valve seats 20, 20', until the through openings 22, 22' are completely closed. Once the through openings 22, 22' have been closed, and therefore the fluid flow through the device has been interrupted, the casings 14, 14' of the two valves 12, 12', and also the two circuit sections C, C', may be disconnected from each other without causing fluid losses from the circuit.

Figure 3:
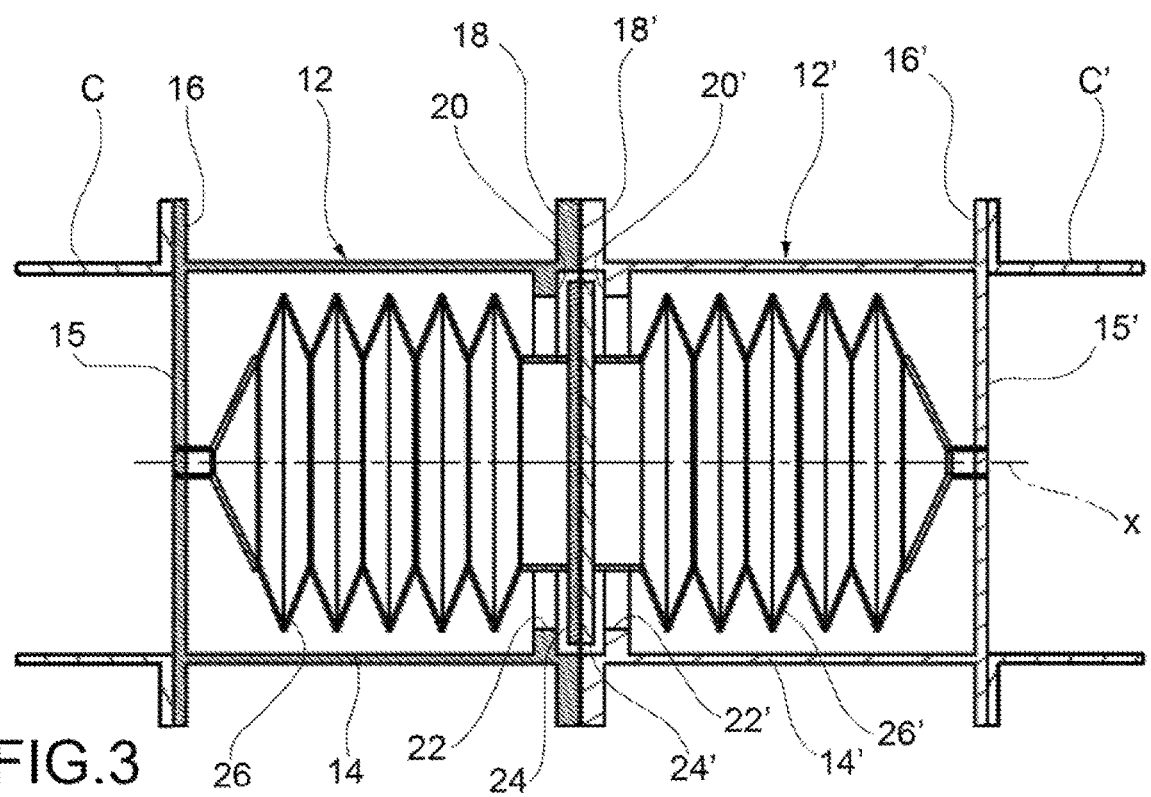
FIGS. 3 and 4 are axial-section views of the connection device of FIG. 1, in the open position and in the closed position, respectively.
Figure 4:
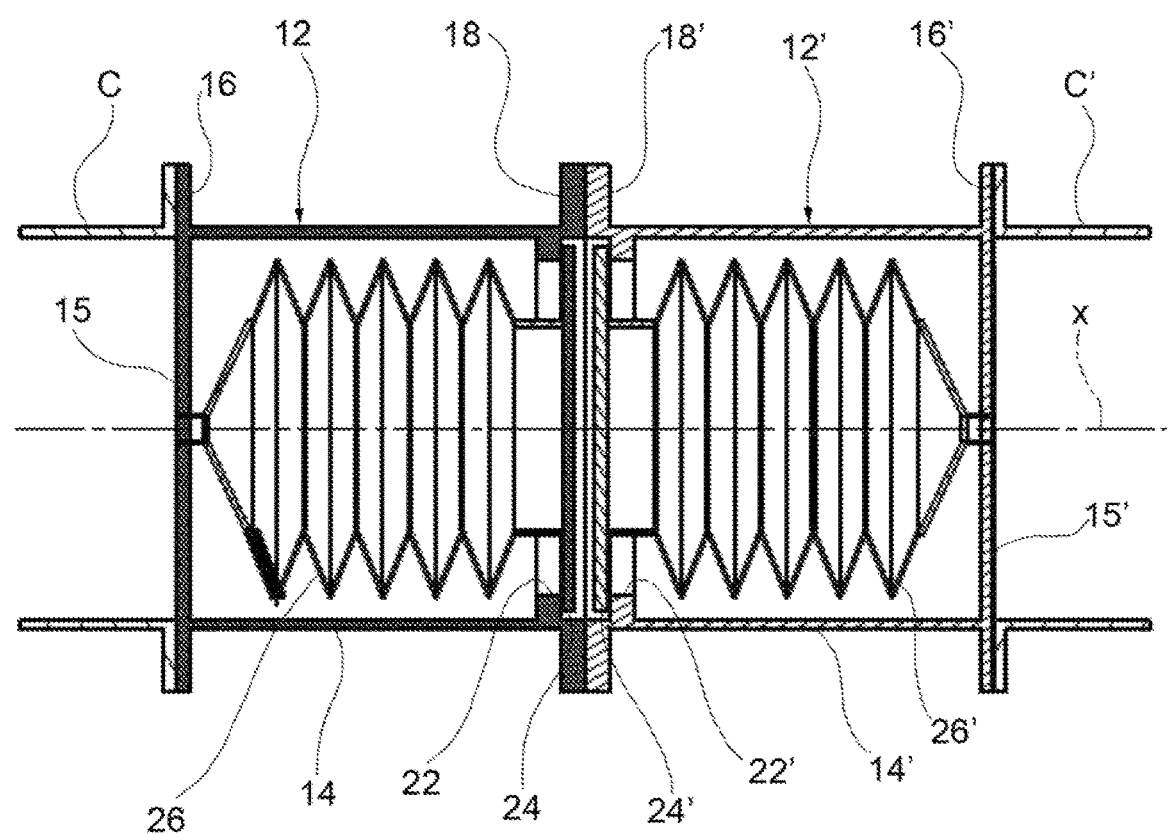
Figure 5:
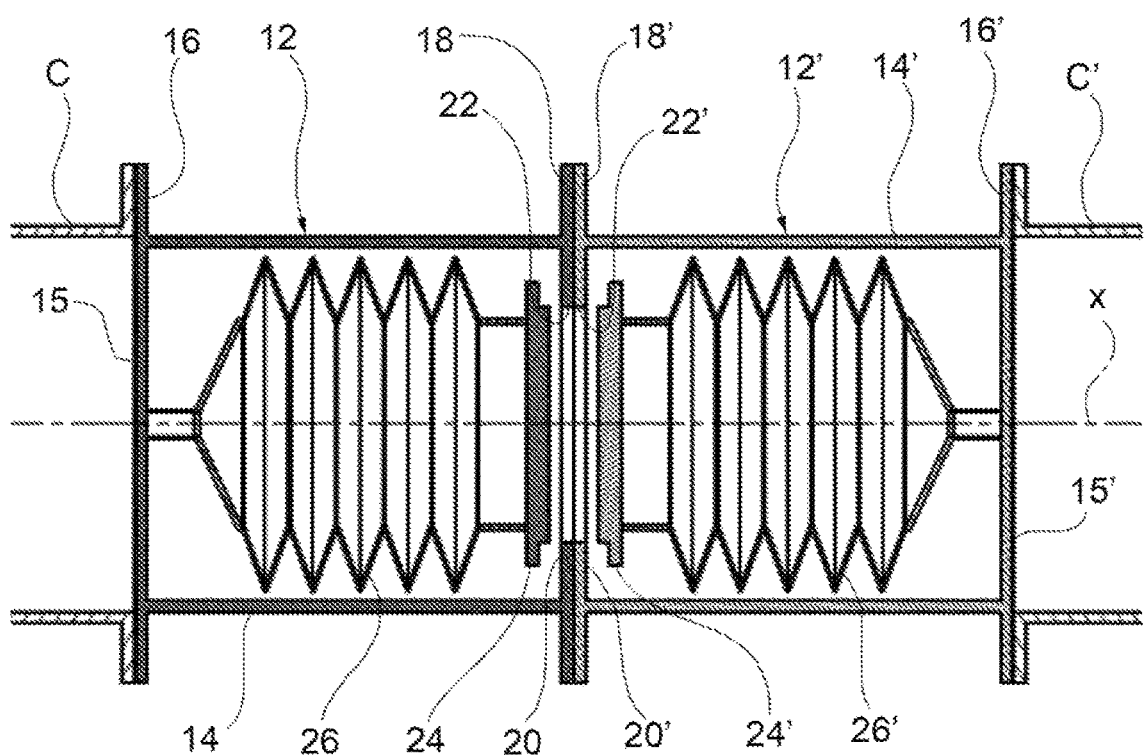
FIGS. 5 and 6 are axial-section views of a connection device for fluid circuits according to a further embodiment of the present invention, in the open position and in the closed position, respectively.
Figure 6:
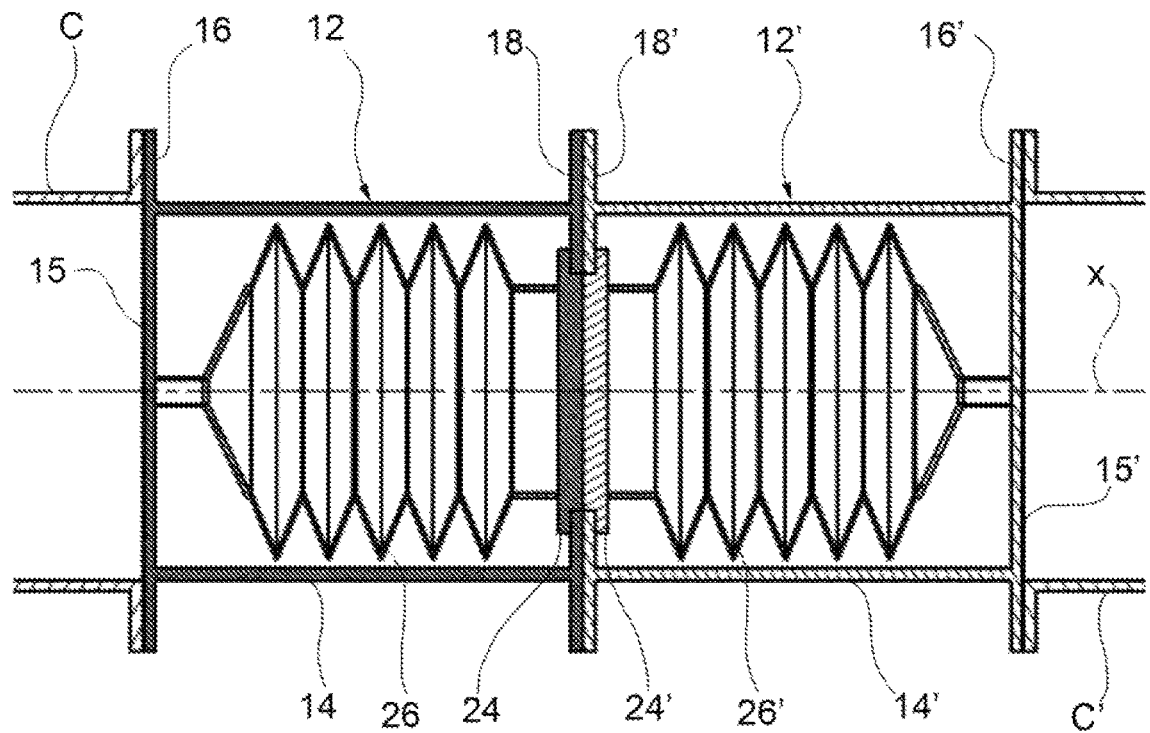

An alternative embodiment of the invention is shown in FIGS. 5 and 6, where parts and elements corresponding to those of FIGS. 3 and 4 have been given the same reference numerals. This embodiment differs from that shown in FIGS. 3 and 4 substantially merely in that the valves 12, 12' are in this case configured to be both in the open position at the working temperature of the fluid, and to shift to the closed position when the fluid temperature exceeds a given threshold value, higher than (or at most equal to) the working temperature of the fluid. In this case, therefore, the expansion of the bellow 26, 26' of each valve 12, 12' as a result of the increase in the fluid temperature causes the movement of the closure member 24, 24' against the valve seat 20, 20', and therefore the closure of the through opening 22, 22', whereas the contraction of the bellow 26, 26' as a result of the decrease in the fluid temperature causes the movement of the closure member 24, 24' away from the valve seat 20, 20', thereby allowing fluid flow through the through opening 22, 22'. Also in this case, therefore, once the through openings 22, 22' have been closed, and hence the fluid flow through the device has been interrupted, as a result of an increase in the fluid temperature above the aforementioned threshold value, the casings 14, 14' of the two valves 12, 12', and also the two circuit sections C, C', may be disconnected from each other without causing fluid losses from the circuit.

Figure 7:
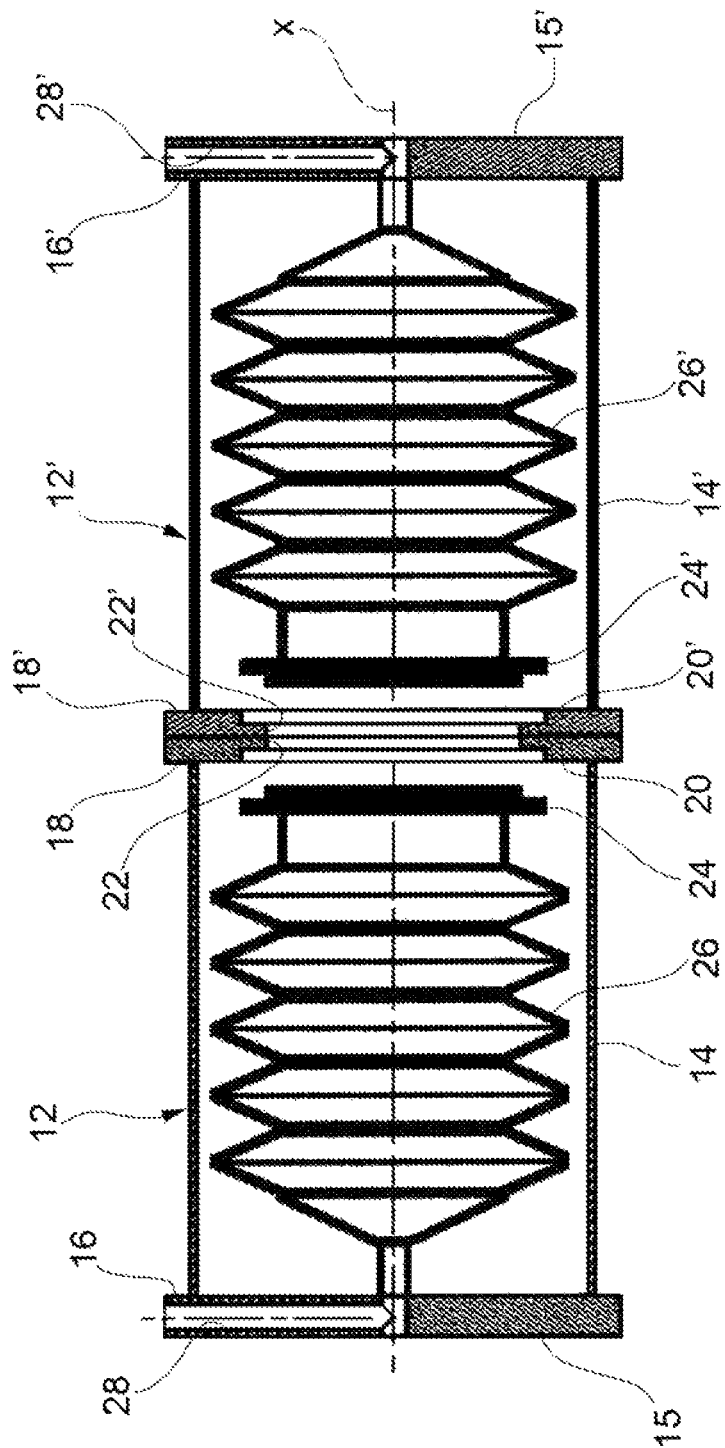
FIG. 7 is an axial-section view of a further connection device for fluid circuits according to the present invention.

With reference finally to FIG. 7, where parts and elements corresponding to those of the preceding Figures have been given the same reference numerals, in the case where the control means are formed by a bellow, the walls 15, 15' of each of the two valves 12, 12' forming the device 10 may have respective holes 28, 28', each of which communicates with a respective bellow 26, 26' and is provided with a respective spring-loaded valve (per-se-known and not shown) to allow pressurization and depressurization of the bellows 26, 26'.

The advantages which can be achieved with a connection device according to the invention are evident from the description provided above. The device has a simple structure, is not expensive, is lightweight and not bulky, and is therefore highly suitable for large-scale use. In addition, owing to the fact that the movement of the closure members of the two valves of the device from the open position to the closed position, or vice versa, is effected not in a sudden manner but gradually, the device avoids the generation of pressure waves during the operation of connecting the two circuit sections. Finally, the connection device according to the invention allows disconnection of the two adjacent circuit sections without causing fluid losses from the circuit, this being particularly advantageous in the case of a hazardous fluid.

Naturally, the principle of the invention remaining unchanged, the embodiments and the constructional details may vary widely from those described and illustrated purely by way of non-limiting example.

What is claimed is:

1. A connection device for fluid circuit, comprising:
   a connection device,
   wherein the connection device is arranged to hydraulically connect two adjacent circuit sections and allow disconnection of the two circuit sections under load without causing fluid losses from the circuit,
   wherein the connection device comprises two thermal expansion valves releasably connected directly to each other,
   wherein each valve is configured to be mounted to an end of a respective circuit section, and is configured to selectively shift to, depending on the fluid temperature, at least one of
      an open position, where each valve allows fluid flow through the connection device, or
      a closed position, where each valve prevents fluid flow through the connection device,
   wherein each valve comprises a tubular casing, a valve seat delimiting a through opening, a closure member movable relative to the valve seat to control fluid flow through the through opening, and a temperature-sensitive reciprocating member for controlling movement of the closure member depending on the fluid temperature,
   wherein the tubular casing of each valve is configured to be connected at a first end thereof to a respective circuit section and has at an opposite end thereof a mounting flange for connection to the casing of the other valve,
   wherein the mounting flanges of the two valves are in direct contact with each other and the valve seats of the two valves, along with the respective closure members, are provided at said opposite ends so as to be facing each other.

2. The connection device according to claim 1, wherein the two valves are configured to shift to the closed position, and hence to allow disconnection of the two circuit sections, when the fluid temperature is below a given threshold.

3. The connection device according to claim 1, wherein the two valves are configured to shift to the closed position, and hence to allow disconnection of the two circuit sections, when the fluid temperature is above a given threshold.

4. The connection device according to claim 1, wherein the two valves are identical to each other.

5. The connection device according to claim 1, wherein said temperature-sensitive reciprocating member comprises a bellow filled with a gas or liquid, the bellow being fixed at a first end thereof to the closure member and at the opposite end thereof to the casing, whereby the closure member is moved relative to the valve seat as a result of a change in the volume of the bellow due to a change in the fluid temperature.

6. The connection device according to claim 5, wherein the casing of each valve has a hole, which communicates with the bellow of the respective valve and is provided with a respective spring-loaded valve to allow pressurization and depressurization of the bellow of the respective valve.

\* \* \* \* \*